(12) United States Patent
Suh et al.

(10) Patent No.: US 9,028,931 B2
(45) Date of Patent: May 12, 2015

(54) DOUBLE WINDOW/DOOR SYSTEM FOR BLOCKING INFRARED LIGHT

(75) Inventors: Moon Suhk Suh, Yongin-si (KR); Jin Woo Cho, Seongnam-si (KR); Jong Hun Han, Goyang-si (KR); Seon-min Kim, Seoul (KR); Kwon-woo Shin, Hwaseung-si (KR)

(73) Assignee: Korea Electronics Technology Institute, Seongnam-Si, Gyeonggi Province (KR)

( * ) Notice: Subject to any disclaimer, the term of this patent is extended or adjusted under 35 U.S.C. 154(b) by 816 days.

(21) Appl. No.: 13/231,755

(22) Filed: Sep. 13, 2011

(65) Prior Publication Data

US 2012/0064265 A1 Mar. 15, 2012

(30) Foreign Application Priority Data

Sep. 13, 2010 (KR) .................. 10-2010-0089234
Aug. 30, 2011 (KR) .................. 10-2011-0087255

(51) Int. Cl.
| | |
|---|---|
| *E06B 3/00* | (2006.01) |
| *C03C 17/36* | (2006.01) |
| *C03C 17/00* | (2006.01) |
| *C03C 17/23* | (2006.01) |
| *E06B 3/66* | (2006.01) |
| *E06B 3/67* | (2006.01) |

(52) U.S. Cl.
CPC ........... *C03C 17/3644* (2013.01); *E06B 3/6612* (2013.01); *E06B 3/6715* (2013.01); *Y02B 80/22* (2013.01); *Y02B 80/24* (2013.01); *C03C 17/007* (2013.01); *C03C 17/23* (2013.01); *C03C 17/366* (2013.01); *C03C 2217/40* (2013.01); *C03C 2217/70* (2013.01); *C03C 2217/734* (2013.01); *C03C 2217/94* (2013.01); *C03C 2218/152* (2013.01); *C03C 2218/154* (2013.01)

(58) Field of Classification Search
CPC ..... E06B 3/6612; E06B 3/6715; Y02B 80/22; Y02B 80/24
USPC .......... 428/34, 212, 432, 701, 702; 52/786.13
See application file for complete search history.

(56) References Cited

U.S. PATENT DOCUMENTS

| | | | | |
|---|---|---|---|---|
| 4,047,351 A | * | 9/1977 | Derner et al. | 52/786.13 |
| 4,173,668 A | * | 11/1979 | Hentzelt et al. | 428/34 |
| 4,786,344 A | * | 11/1988 | Beuther | 156/109 |
| 5,169,694 A | * | 12/1992 | Endo et al. | 428/34 |
| 5,332,618 A | * | 7/1994 | Austin | 428/216 |

(Continued)

FOREIGN PATENT DOCUMENTS

| | | |
|---|---|---|
| KR | 10-0658376 | 3/2000 |
| KR | 10-0828201 | 4/2008 |
| KR | 10-2010-0031034 | 3/2010 |

(Continued)

*Primary Examiner* — Donald J Loney
(74) *Attorney, Agent, or Firm* — Lowe Hauptman & Ham, LLP (57) ABSTRACT

There is provided a double window/door system for blocking infrared rays which includes a first glass member, a second glass member, and a spacer positioned between the first glass member and the second glass member for maintaining the space between the first glass member and the second glass member, characterized in that one of the surfaces of the first glass member is coated with a nano substance film for blocking near infrared rays and one of the surfaces of the second glass member is coated with a thermochromic substance film.

7 Claims, 5 Drawing Sheets

(56) References Cited

U.S. PATENT DOCUMENTS

2007/0128449 A1* 6/2007 Taylor et al. ................. 428/432
2009/0197098 A1* 8/2009 Polcyn et al. ................. 428/432

FOREIGN PATENT DOCUMENTS

| WO | WO-2008/085680 | 7/2008 |
| WO | WO-2010/043828 | 4/2010 |

* cited by examiner

DOUBLE WINDOW/DOOR SYSTEM FOR BLOCKING INFRARED LIGHT

CROSS-REFERENCE TO RELATED APPLICATION

This application claims priority to Korean Patent Application No. 10-2011-0087255 filed 30 Aug. 2011, and Korean Patent Application No. 10-2010-0089234, filed on Sep. 13, 2010, the disclosure of which is hereby incorporated herein by reference in its entirety.

BACKGROUND OF THE INVENTION

1. Field of the Invention

The present invention relates to a double window/door system for blocking infrared rays, and more particularly, to a double window/door system for blocking infrared rays, thereby increasing the degree of blocking infrared rays in glass of a dual structured window, to save energy required for cooling and heating in a room.

2. Description of the Related Art

In conventional windows and doors of most dwellings and buildings, the insulation is very weak so that 45% or more of the heat energy in the structures is lost through the windows and doors.

To reduce heat loss, multiple panes of glass have been arranged in the forms of double panes and triple panes by using a method of connecting multiple layers of glass. Multiple panes of glass are manufactured by positioning a spacer to keep space between a pair of panes, applying an adhesive, such as butyl rubber, on both sides of the spacer and then applying predetermined pressure and heat in a vacuum so that the panes are glued to the both sides of the spacer. These multiple panes of glass are effective in soundproofing and insulating due to the vacuum formed between the panes and therefore these are widely used as building materials.

In the constitution of multiple panes of glass, ordinary glass is used for the panes or low-E glass (low-emissivity glass) and ordinary glass are used for the panes. Low-E glass is similar to ordinary glass in transmittance. Ordinary glass reflects only a part of infrared rays. To improve the insulation of a building, low-E glass is formed by coating the inside of ordinary glass with a special metal film [generally, silver (Ag)] having a high ratio of reflecting infrared rays. Since the special metal film of low-E glass transmits visible light to improve lighting inside and it reflects infrared rays to minimize heat transfer between inside and outside, low-E glass is energy saving glass making the change in the inside temperature small. Based on a coating manufacturing method, low-E glass is classified into hard low-E glass by a pyrolytic process and soft low-E glass by a sputtering process.

Low-E glass has differences according to usage conditions. However, low-E glass has an energy saving effect of about 50% in comparison with a single pane of glass and an energy saving effect of about 25% in comparison with ordinary multiple panes of glass. Due to these merits, low-E glass is used for windows or lighting in homes and general buildings and it is used for energy saving. Specifically, low-E glass is proper for hospitals, hotels, etc. wherein heating/cooling systems are operated for 24 hours.

Figure 1:
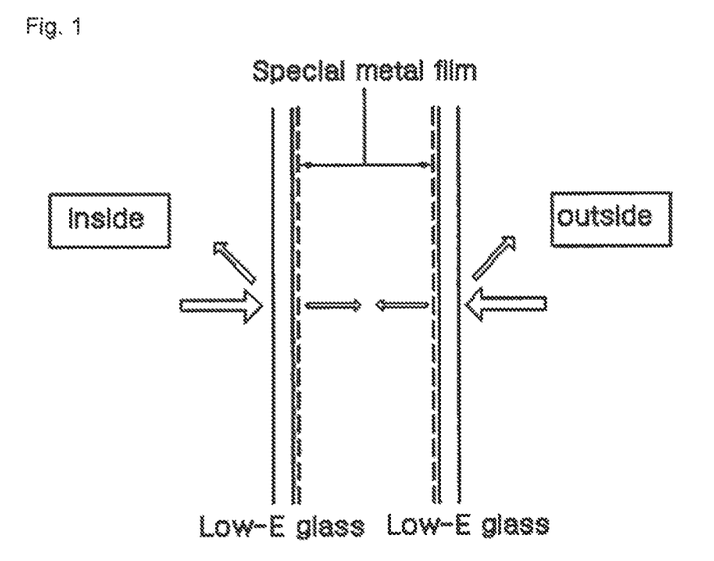
FIG. 1 illustrates the constitution of a conventional double window/door system comprising two sheets of low-E glass.

However, when low-E glass is used in each pane to better block infrared rays as illustrated in FIG. 1, the reduction extent of infrared rays by the double panes of low-E glass is not doubled, as desired, compared with the reduction extent of infrared rays by a single pane of low-E glass. Moreover, the transmittance of visible light significantly drops to make the inside dark. Thus, there is a problem in using double panes of low-E glass for ordinary windows or doors.

When double panes of low-E glass are used, an inactivate gas is introduced between the panes, thereby partially decreasing heat rays/infrared rays. However, a small glass manufacturer having no special equipment cannot easily perform this re-processing work.

SUMMARY OF THE INVENTION

Therefore, it is an object of the present invention to provide a double window/door system which blocks heat energy entering inside or going outside by preliminarily reflecting infrared rays by coating ordinary glass with an infrared ray reflecting substance and then secondarily reflecting the rest of the infrared rays not blocked by using low-E glass or glass coated with a thermochromic substance.

In accordance with a first embodiment of the present invention, there is provided a double window/door system for blocking infrared rays, comprising: a first glass member, a second glass member, and a spacer positioned between the first glass member and the second glass member to maintain space between the first and second glass members.

One surface of the first glass member is coated with a nano substance film for reflecting near infrared rays and one surface of the second glass member is coated with a thermochromic substance film.

Preferably, the nano substance film for reflecting near infrared rays may be formed by laminating a plurality of insulators having respectively different refractive indexes.

The insulators as laminated may include one or more selected from a group of ITO, ATO, ITO+ATO, IATO, $TiO_2$, $Ta_2O_5$, ZnO, $SiO_2$, SiN and $Al_2O_3$.

The thermochromic substance film used in the second glass member includes vanadium dioxide as the main material.

The thermochromic substance film used in the second glass member may further include molybdenum (Mo) or tungsten as an additive in addition to the vanadium dioxide.

The first glass member used in the double window/door system may be used as the outside glass of the double window/door system and the second glass member may be used as the inside glass of the double window/door system, however, even though the first glass member is used as the inside glass of the double window/door system and the second glass member is used as the outside glass of the double window/door system, a similar effect(s) can be obtained.

The nano substance film for reflecting near infrared rays may be formed by alternately laminating $TiO_2$ with a high refractive index and $SiO_2$ with a relatively low refractive index.

In accordance with a second embodiment of the present invention, there is provided a double window/door system for blocking infrared rays, comprising: a first glass member having one of its surfaces coated with a nano substance film for reflecting near infrared rays, a second glass member formed of low-E glass having one of its surfaces coated with a special metal film, and a spacer positioned between the first glass member and the second glass member to maintain the glass members so as to be spaced apart from each other, wherein the nano substance film for reflecting near infrared rays in the first glass member and the special metal film in the second glass member are positioned opposite each other.

The nano substance film for reflecting near infrared rays on the first glass member is formed of a plurality of layers by alternately laminating a first insulator and a second insulator, and preferably, a refractive index of the first insulator may be greater than a refractive index of the second insulator.

Preferably the first insulator may include one of ITO, ATO, ITO+ATO, IATO, TiO$_2$, Ta$_2$O$_5$ and ZnO and the second insulator may include one of SiO$_2$, SiN and Al$_2$O$_3$.

BRIEF DESCRIPTION OF THE DRAWINGS

The above and other features and advantages of the present invention will become more apparent to those of ordinary skill in the art by describing in detail a preferred embodiment thereof with reference to the attached drawings in which.

DETAILED DESCRIPTION OF THE PREFERRED EMBODIMENT

The present invention will now be described more fully hereinafter with reference to the accompanying drawings, in which a preferred embodiment of the invention is shown so that those of ordinary skill in the art can easily carry out the present invention.

A double window/door system for blocking infrared rays according to the present invention effectively blocks heat energy entering inside or going outside by preliminarily blocking infrared rays by coating ordinary glass with a substance reflecting infrared rays and then by secondarily reflecting the rest of the infrared rays which are not blocked by the ordinary glass coated with the substance of reflecting infrared rays by additionally using low-E glass or glass coated with a thermochromic substance.

First Embodiment

Figure 2:
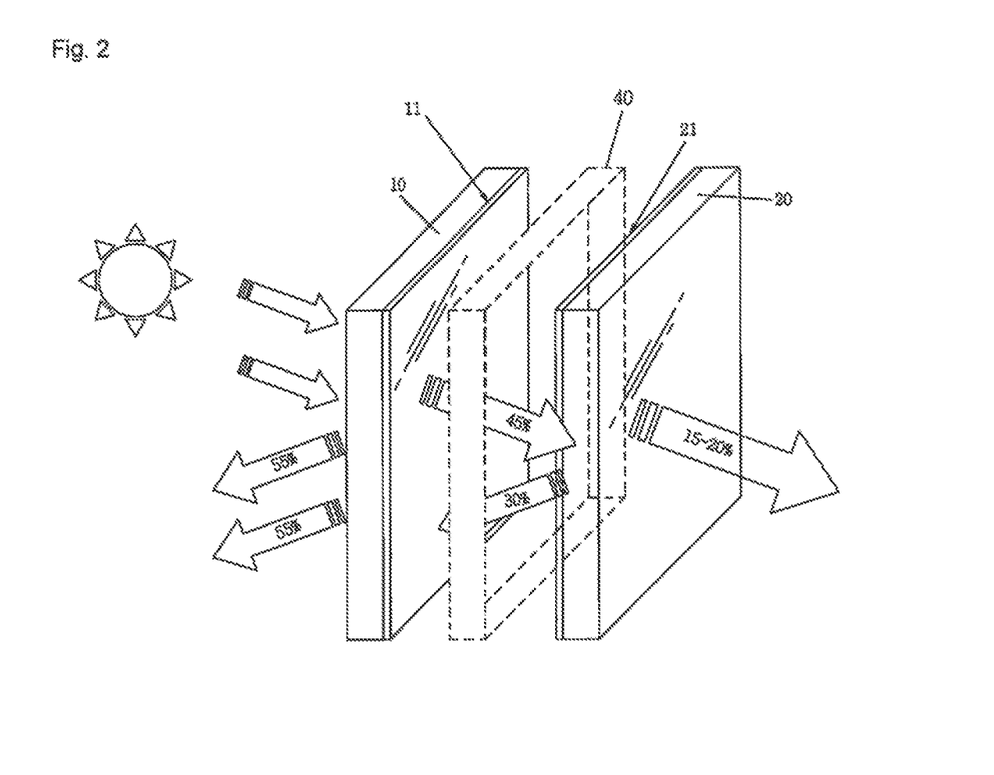
FIG. 2 illustrates the constitution of a double window/door system for blocking infrared rays according to a first embodiment of the present invention.
Figure 3:
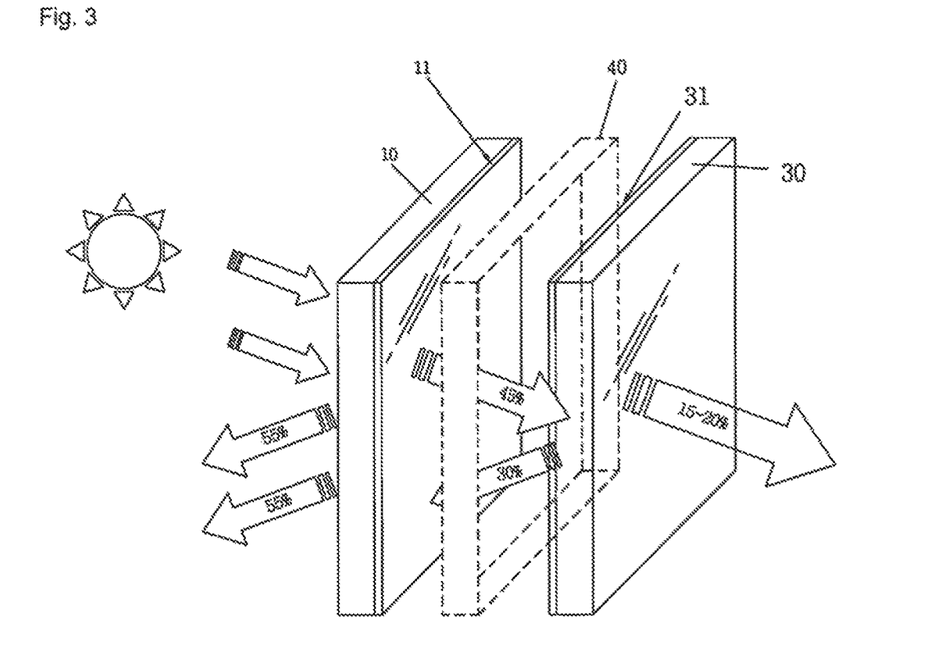
FIG. 3 illustrates the constitution of a double window/door system for blocking infrared rays according to a second embodiment of the present invention.
Figure 4:
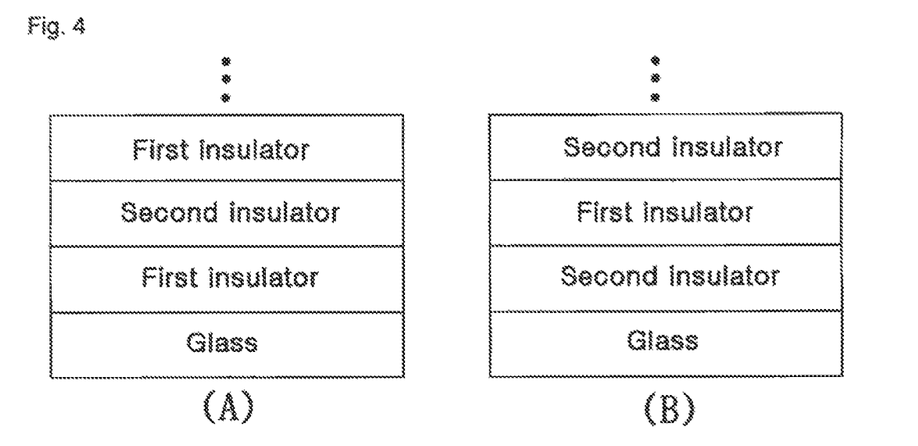
FIG. 4 illustrates an example of the constitution in that a nano substance film for reflecting near infrared rays is formed in a plurality of layers on a glass member of the present invention.

FIG. 2 illustrates the constitution of a double window/door system for blocking infrared rays according to a first embodiment of the present invention, FIG. 3 illustrates the constitution of a double window/door system for blocking infrared rays according to a second embodiment of the present invention, and FIG. 4 illustrates an example of the constitution in that a nano substance film for reflecting near infrared rays is formed in a plurality of layers on a glass member of the present invention. The double window/door system for blocking infrared rays according to the embodiment of the present invention will be described in detail with reference to the accompanying drawings.

As illustrated in FIG. 2, the double window/door system for blocking infrared rays according to the first embodiment of the present invention comprises: a first glass member 10 having one of its surfaces coated with a nano substance film 11 for reflecting near infrared rays, a second glass member 20 having one of its surfaces coated with a thermochromic substance film 21, and a spacer 40 positioned between the first glass member 10 and the second glass member 20 to maintain a space between the first and for reflecting near infrared rays on the first glass member 10 and the thermochromic substance film 21 on the second glass member 20 are positioned to be opposite each other.

The nano substance film for reflecting near infrared rays as generally used consists of a nano metal oxide having the property of blocking light of the infrared region of solar light. Since most nano metal oxides form metal bonds, they have a regular structure in which the molecular space is uniform and thus they are capable of blocking infrared rays in most regions. Therefore, all of ordinary nano metal oxides are usable. The present invention may use any one or more of ITO (Indium-Tin Oxide), ATO (Antimony doped Tin Oxide), ITO+ATO and IATO (Indium Antimony doped Tin Oxide) which are tin oxides having a particle size of 10~100 nm.

As shown in Table 1, another nano substance for reflecting near infrared rays may use any one or more of ZnO (Zinc Oxide), TiO$_2$ (Titanium Oxide) and Ta$_2$O$_5$ (Tantalum Pentoxide) which have relatively high refractive indexes and Al$_2$O$_3$ (Aluminum Oxide), SiO$_2$ (Silicon Dioxide) and SiN (Silicon Nitride) which have relatively low refractive indexes, to control wavelengths as needed and to be coated on various glass, such as ordinary glass or tempered glass through a heat treatment process, regardless of the thickness of the glass.

TABLE 1

| Substance | Refractive index |
|---|---|
| ITO | 2.0 |
| ZnO | 1.9~2.0 |
| TiO$_2$ | 2.1 |
| Ta$_2$O$_5$ | 2.0 |
| Al$_2$O$_3$ | 1.63 |
| SiO$_2$ | 1.45 |
| SiN | 1.6 |

In accordance with the present invention, as illustrated in FIG. 4, the first glass member 10 having one surface coated with the nano substance film 11 for reflecting near infrared rays may be formed in a plurality of layers according to target transmittance, by using a difference in refractive index of the nano substance for reflecting near infrared rays.

That is, a first insulator having a relatively high refractive index of 2.0 or so and a second insulator having a relatively low refractive index of 1.5 or so are alternately coated on the first glass member 10, so that an insulation layer of a high refractive index and an insulation layer of a low refractive index are alternately formed. The number of the insulation layers with a high refractive index and the insulation layers with a low refractive index as laminated may be randomly controlled according to target transmittance.

As illustrated in FIG. 4 (A), the first glass member 10 may be formed by repeatedly coating the first insulator having a relatively high refractive index on the glass member 10, coating the second insulator having a relatively low refractive index on the first insulator, and coating the first insulator on the second insulator.

Further, as illustrated in FIG. 4 (B), the first glass member 10 may be formed by repeatedly coating the second insulator having a relatively low refractive index on the glass member 10, coating the first insulator having a relatively high refractive index on the second insulator, and coating the second insulator on the first insulator.

Preferably, the first insulator forming the insulation layer with a high refractive index may use one of $TiO_2$ (Titanium Oxide), $Ta_2O_5$, ZnO5, ITO, ATO, ITO+ATO and IATO and the second insulator forming the insulation layer with a low refractive index may use one of $SiO_2$ (Silicon Dioxide), SiN (Silicon Nitride) and $Al_2O_3$.

The nano substance film 11 may be formed by dispersing the nano substance for reflecting near infrared rays in a water or alcohol solvent, applying the nano substance as dispersed to one surface of the first glass member 10 by using one of a diversity of methods, such as a spin coating method, a deep coating method, a spray coating method, an offset printing method, a coating method by using a brush or sponge and a liquid coating method, and heat-processing the nano substance as applied in a temperature of 50~250° C. In the present invention, the nano substance film 11 for reflecting near infrared rays is formed mainly by a sputtering method and a CVD (Chemical Vapor Deposition) method.

The second glass member 20 coated with the thermochromic substance film 21 is described. The second glass member 20 forming the thermochromic substance film 21 is the transmittance variable glass in which transmittance varies in reaction to light having a specific wavelength or a temperature change. In the present invention, $VO_2$ (Vanadium Dioxide) is used as the thermochromic substance by using the optical property changes in that electrical resistance decreases at a higher than a specific temperature and lighting decreases.

Vanadium dioxide used as the thermochromic substance in the present invention has the electric characteristic which changes from a semiconductor to a conductor at a temperature of 70° C. (phase inversion temperature) which is relatively close to room temperature. Vanadium dioxide indicates a negative electrical resistance characteristic according to a temperature rise in a semiconductor region and the electrical resistance decreases as a temperature rises up to the phase inversion temperature or below. Then, the electrical resistance rapidly decreases to $1/10~1/10^4$ at the phase inversion temperature. Further, vanadium oxide acts as an electrical conductor at the phase inversion temperature or above and it generally has a regular electrical resistance. The synthesis and deposition of a thin film of vanadium dioxide are performed through a heat-treatment process after a sol-gel method, a CVD method or a sputtering method is used.

In the present invention, a dopant, such as W (tungsten) or Mo (molybdenum), is added to vanadium dioxide used as the thermochromic substance coated on the glass, wherein as the content of the dopant increases, the total resistance value decreases and thus transmittance of infrared rays decreases.

The spacer 40 positioned between the first glass member 10 and the second glass member 20 to maintain a space between the glass members may take various forms. In the present invention, the spacer 40 is constituted to maintain a space of 6 mm between the first and the second glass member, however, the present invention is not limited to only this separation spacing.

Figure 5:
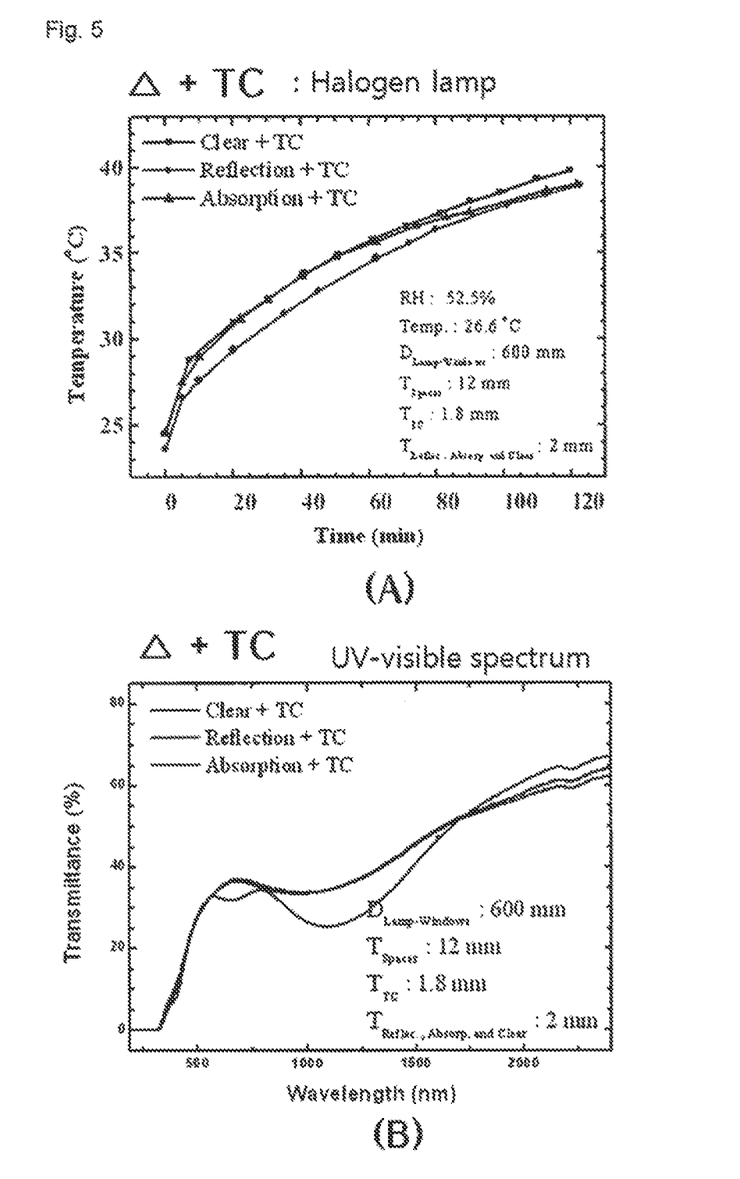
FIG. 5 illustrates the temperature rise and transmittance of infrared rays with time in a double window/door system wherein a nano substance film for reflecting near infrared rays is formed on the outside glass and a thermochromic substance film is formed on the inside glass, another double window/door system comprising non-coated glass and glass coated with a thermochromic substance, and another double window/door system comprising glass coated with a substance of absorbing near infrared rays and glass coated with a thermochromic substance.

FIG. 5 illustrates a temperature rise graph according to time and transmittance according to a wavelength range in the double window/door system of the first embodiment. In this drawing, Δ indicates transparent non-coated glass, glass with the nano substance film for reflecting near infrared rays according to the present invention, and glass with the coating film for absorbing near infrared rays, and TC indicates glass coated with the thermochromic substance film.

In this test, measurements were performed by using a 2 KW halogen lamp inside. The distance between the halogen lamp and the double window/door system was measured as 60 cm. The measurements was performed in the environments of relative humidity being 52.5% and temperature being 26.6° C. The thickness between the first glass member and the second glass member (that is, the thickness of the spacer) was 12 mm. The thickness of the first glass member used as the outside glass was 1.8 mm and the thickness of the second glass member used as the inside glass was 2 mm.

The nano substance film 11 for reflecting near infrared rays according to the first embodiment of the present invention used a combination of $TiO_2$ having a relatively high refractive index and $SiO_2$ having a relatively low refractive index. $TiO_2$ of 105 nm, $SiO_2$ of 165 nm and $TiO_2$ of 105 nm were laminated in order to be coated on the first glass member 100.

As illustrated in FIG. 5(A), the temperature rise according to time is kept low in the double window/door system (indicated as a red line in the drawing) comprising the glass coated with the nano substance film for reflecting near infrared rays and the glass coated with the thermochromic substance film according to the first embodiment of the present invention, compared with the double window/door system (indicated as a black line in the drawing) comprising the non-coated glass and the glass coated with the thermochromic substance, and the double window/door system (indicated as a blue line in the drawing) comprising the glass coated with the substance of absorbing near infrared rays and the glass coated with the thermochromic substance.

As illustrated in FIG. 5(B), the transmittance of near infrared rays in a wavelength bandwidth of about 800~2500 nm is kept very low in the double window/door system (indicated as a red line in the drawing) comprising the glass coated with the nano substance film for reflecting near infrared rays and the glass coated with the thermochromic substance film according to the first embodiment of the present invention, compared with the double window/door system (indicated as a black line in the drawing) comprising the non-coated glass and the glass coated with the thermochromic substance, and the double window/door system (indicated as a blue line in the drawing) comprising the glass coated with the substance of absorbing near infrared rays and the glass coated with the thermochromic substance.

In the double window/door system for blocking infrared rays according to the first embodiment of the present invention, about 55% of the near infrared rays of the wavelength range of 800~1300 nm is reflected by the first glass member 10 coated with the nano substance for reflecting near infrared rays and the light within a portion of the wavelength range of 800~2500 nm of the remaining about 45% near infrared rays transmitting the first glass member 10 is further reflected by the thermochromic substance film 21 coated on the second glass member 20. Consequentially, since the infrared rays within the wavelength range of 800~2500 nm passing the double window/door system are only about 15~20% of the total infrared rays incident on the first glass member 10, the double window/door system according to the first embodiment of the present invention has an outstanding capability of blocking infrared rays.

The double window/door system according to the first embodiment of the present invention has been described above. However, the present invention is not limited to the first embodiment and various modified examples may be possible. For example, in the first embodiment, the glass member coated with the nano substance film 11 for reflecting near infrared rays is used as the outside glass and the glass member coated with the thermochromic substance film 21 is used as the inside glass. However, on the contrary to this, in a modified example, the glass member coated with the thermochromic substance film 21 may be used as the outside glass and the glass member coated with the nano substance film 11 for reflecting near infrared rays may be used as the inside glass.

Figure 6:
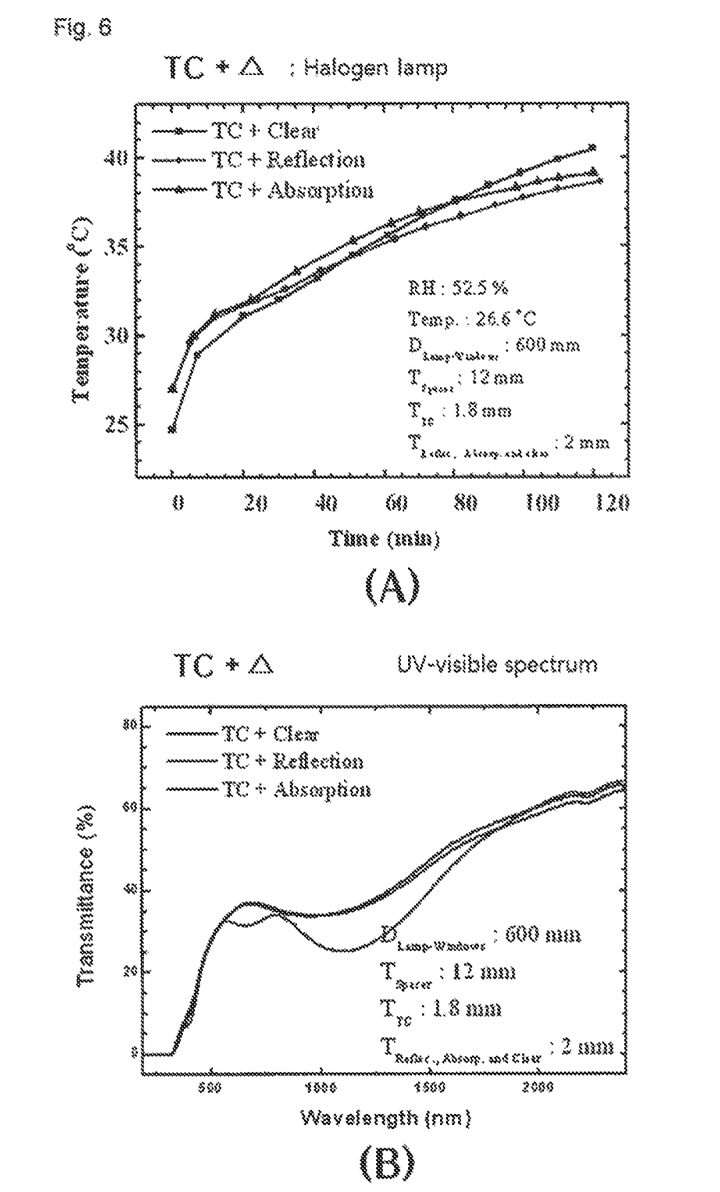
FIG. 6 illustrates the temperature rise and transmittance of infrared rays with time in a double window/door system wherein a nano substance film for reflecting near infrared rays is formed on the inside glass and a thermochromic substance film is formed on the outside glass, another double window/door system comprising non-coated glass and glass coated with a thermochromic substance, and another double window/door system comprising glass coated with a substance of absorbing near infrared rays and glass coated with a thermochromic substance.

FIG. 6 illustrates a temperature rise graph according to time and transmittance according to a wavelength range in the double window/door system of the modified example wherein the outside glass is coated with the thermochromic substance film 21 and the inside glass is coated with the nano substance film 11 for reflecting near infrared rays. In this drawing, Δ indicates transparent glass which is non-coated, glass with the nano substance film for reflecting near infrared rays according to the present invention, and glass with the coating film for absorbing near infrared rays, and TC indicates glass coated with the thermochromic substance film.

In the same manner as stated above, measurements of this test were performed by using a 2 KW halogen lamp inside. The distance between the halogen lamp and the double window/door system was measured as 60 cm. The measurements were performed in the environments of relative humidity being 52.5% and temperature being 26.6° C. The thickness between the first glass member and the second glass member (that is, the thickness of the spacer) was 12 mm. The thickness of the first glass member used as the outside glass was 1.8 mm and the thickness of the second glass member used as the inside glass was 2 mm.

In the same manner as the first embodiment, the nano substance film 11 for reflecting near infrared rays in the modified example used a combination of $TiO_2$ having a relatively high refractive index and $SiO_2$ having a relatively low refractive index. $TiO_2$ of 105 nm, $SiO_2$ of 165 nm and $TiO_2$ of 105 nm were laminated in order to be coated on the first glass member 100.

As illustrated in FIG. 6(A), a low temperature rise is maintained at a reference point of about 40 minutes in the double window/door system (indicated as a red line in the drawing) wherein the glass coated with the thermochromic substance film is used as the outside glass and the glass coated with the nano substance film for reflecting near infrared rays is used as the inside glass, compared with the double window/door system (indicated as a black line in the drawing) comprising the glass coated with the thermochromic substance and the non-coated glass, and the double window/door system (indicated as a blue line in the drawing) comprising the glass coated with the thermochromic substance and the glass coated with the substance of absorbing near infrared rays.

As illustrated in FIG. 6(B), like the first embodiment of the present invention, the transmittance of near infrared rays in a wavelength bandwidth of about 800~1800 nm is kept very low in the double window/door system (indicated as a red line in the drawing) wherein the glass coated with the thermochromic substance film is used as the outside glass and the glass coated with the nano substance film for reflecting near infrared rays is used as the inside glass, compared with the double window/door system (indicated as a black line in the drawing) comprising the glass coated with the thermochromic substance and the non-coated glass, and the double window/door system (indicated as a blue line in the drawing) comprising the glass coated with the thermochromic substance and the glass coated with the substance of absorbing near infrared rays.

As described above, the double window/door system for blocking infrared rays according to the present invention has an outstanding capability of blocking infrared rays by using the glass coated with the nano substance film for reflecting infrared rays and the glass coated with the thermochromic substance film.

Second Embodiment

As illustrated in FIG. 3, the double window/door system for blocking infrared rays according to the second embodiment of the present invention comprises: a first glass member 10 having one of its surfaces coated with a nano substance film 11 for reflecting near infrared rays, a second glass member 30 formed of low-E glass having one of its surfaces coated with a special metal film 31, a spacer 40 positioned between the first glass member 10 and the second glass member 30 to maintain the glass members so as to be spaced apart from each other, wherein the nano substance film 11 for reflecting near infrared rays on the first glass member 10 and the special metal film 31 of the second glass member 30 are positioned opposite each other.

The first glass member 10 having one of its surfaces coated with the nano substance film 11 for reflecting near infrared rays is formed in the same manner as the first embodiment as described above.

The low-E glass used as the second glass member 30 is coated with a special metal [generally, silver (Ag)] on one of its surfaces, thereby permitting visible light to pass to increase lighting inside and reflecting infrared rays to minimize heat transfer between the inside and outside and therefore to make the change in the inside temperature small.

The spacer 40 is positioned between the first glass member 10 and the second glass member 30. The spacer 40 may be formed in various forms or shapes to maintain the space between the glass members. In the present invention, the spacer 40 is formed to maintain the space of 6 mm, however, it is not limited to this spacing.

Figure 7:
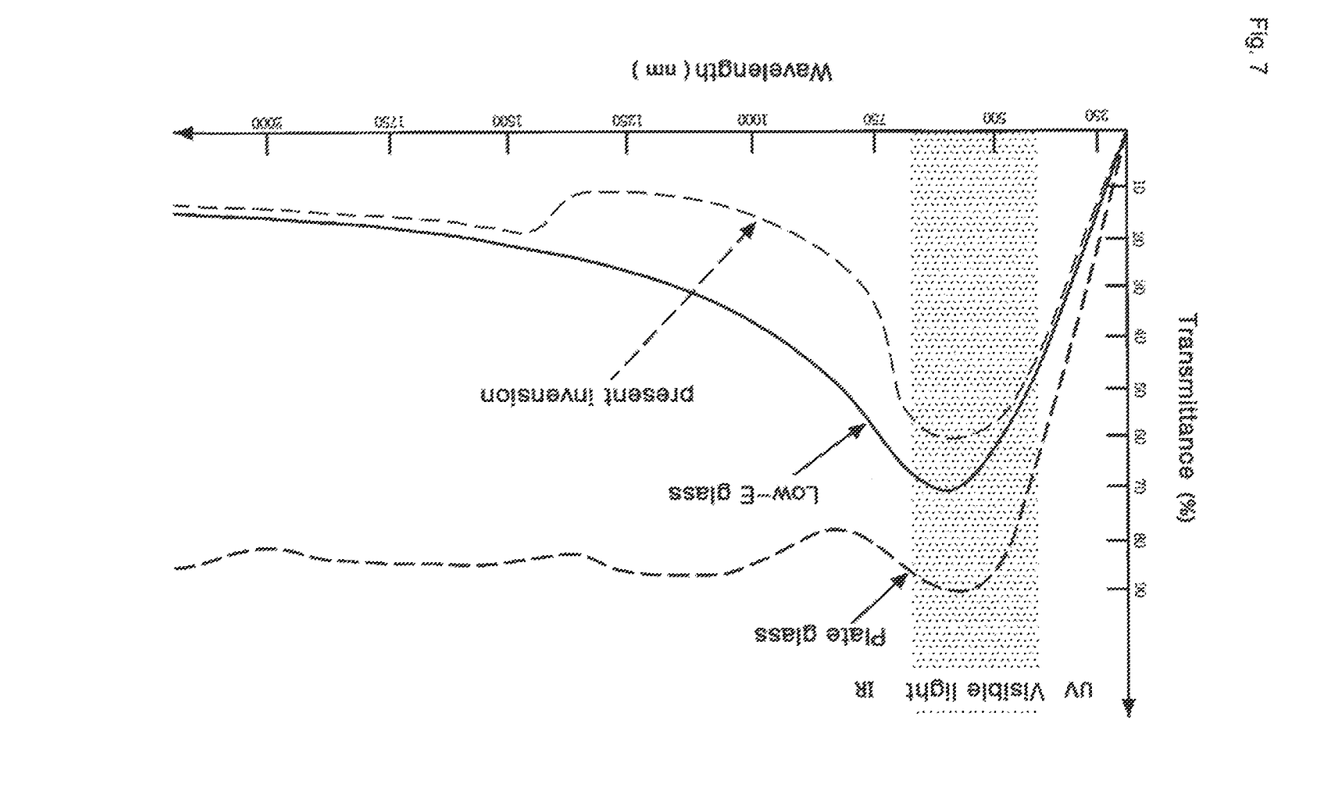
FIG. 7 illustrates transmittance to wavelengths of light entering into the double window/door system for blocking infrared rays according to the present invention.

FIG. 7 is a graph illustrating the transmittance to wavelengths of light entering into the double window/door system for blocking infrared rays according to the present invention. The light transmittance in the near infrared ray range (750~3000 nm) significantly decreases in the double window/door system using the glass coated with the thermochromic substance film and the glass coated with the nano substance film for reflecting infrared rays in comparison with the double window/door system using plate glass or low-E glass only.

As described above, the double window/door system for blocking infrared rays according to the present invention decreases the extent at which infrared rays enter inside to prevent the inside temperature from rising and prevents heat from going outside, thereby contributing to indoor cooling/heating energy saving.

Furthermore, the double window/door system for blocking infrared rays according to the present invention increases the degree of blocking infrared rays and it also increases a rate of transmitting visible light, thereby being advantageous in securing a clear view inside.

Furthermore, the double window/door system for blocking infrared rays according to the present invention is realized by using two sheets of ordinary glass coated with a substance of reflecting infrared rays and a thermochromic substance, respectively, thereby significantly reducing a manufacturing unit price in comparison with a conventional double window/door system for blocking infrared rays.

The invention has been described using a preferred exemplary embodiment. However, it is to be understood that the scope of the invention is not limited to the disclosed embodiment. On the contrary, the scope of the invention is intended to include various modifications and alternative arrangements within the capabilities of persons skilled in the art using presently known or future technologies and equivalents. The scope of the claims, therefore, should be accorded the broadest interpretation so as to encompass all such modifications and similar arrangements.

BRIEF DESCRIPTION OF REFERENCE NUMBERS OF ELEMENTS

10: first glass member
11: nano substance film for reflecting near infrared rays
20: second glass member
21: thermochromic substance film
40: spacer

What is claimed is:

1. A double window/door system for blocking infrared rays, comprising:
 a first glass member having one surface coated with a nano substance film configured to block near infrared rays;
 a second member formed of low-E glass, and having one surface coated with a metal film; and
 a spacer positioned between the first glass member and the second glass member, and configured to maintain a spacing between the first and second glass members,
 wherein the nano substance film on the first glass member and the metal film on the second glass member are positioned opposite each other,
 wherein the nano substance film comprises a plurality of layers including a first insulator and a second insulator which are alternately laminated,
 wherein a refractive index of the first insulator is greater than a refractive index of the second insulator,
 wherein the first insulator comprises Indium Tin Oxide (ITO) and Antimony Tin Oxide (ATO).

2. The double window/door system for blocking infrared rays according to claim 1, wherein the second insulator comprises $SiO_2$.

3. The double window/door system for blocking infrared rays according to claim 1, wherein the first glass member is configured as the outside glass of the double window/door system and the second glass member is configured as the inside glass thereof.

4. The double window/door system for blocking infrared rays according to claim 1, wherein the first glass member is configured as the inside glass of the double window/door system and the second glass member is configured as the outside glass thereof.

5. The double window/door system for blocking infrared rays according to claim 1, wherein the second insulator comprises SiN.

6. The double window/door system for blocking infrared rays according to claim 1, wherein the second insulator comprises $Al_2O_3$.

7. The double window/door system for blocking infrared rays according to claim 1, wherein the ITO has a particle size of 10-100 nm.

* * * * *